(12) United States Patent
Liang et al.

(10) Patent No.: US 11,813,523 B2
(45) Date of Patent: Nov. 14, 2023

(54) AUTOMATIC TRIGGERING OF A GAMEPLAY RECORDING USING VISUAL AND ACOUSTIC FINGERPRINTS

(71) Applicant: ATI Technologies ULC, Markham (CA)

(72) Inventors: Wei Liang, Markham (CA); Le Zhang, Markham (CA); Ilia Blank, Markham (CA); Patrick Pak Kin Fok, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/467,120

(22) Filed: Sep. 3, 2021

(65) Prior Publication Data

US 2023/0071892 A1   Mar. 9, 2023

(51) Int. Cl.
*A63F 13/497* (2014.01)
*A63F 13/53* (2014.01)
*A63F 13/54* (2014.01)
*G06V 20/40* (2022.01)

(52) U.S. Cl.
CPC ............ *A63F 13/497* (2014.09); *A63F 13/53* (2014.09); *A63F 13/54* (2014.09); *G06V 20/40* (2022.01); *G06V 20/44* (2022.01)

(58) Field of Classification Search
CPC ................................ A63F 13/497; A63F 13/53
See application file for complete search history.

(56) References Cited

U.S. PATENT DOCUMENTS

| | | | |
|---|---|---|---|
| 2015/0251093 A1* | 9/2015 | Trombetta | A63F 13/86 463/24 |
| 2016/0199742 A1* | 7/2016 | McCarthy | A63F 13/795 463/31 |
| 2017/0106283 A1* | 4/2017 | Malyuk | A63F 13/49 |
| 2017/0157512 A1* | 6/2017 | Long | A63F 13/497 |
| 2018/0001216 A1* | 1/2018 | Bruzzo | A63F 13/32 |
| 2020/0045382 A1* | 2/2020 | Montgomery | H04N 21/233 |

* cited by examiner

*Primary Examiner* — James S. McClellan
(74) *Attorney, Agent, or Firm* — Volpe Koenig

(57) ABSTRACT

Systems and methods are disclosed that automatically generating a gameplay recording from an application. Techniques are provided to extract data from a buffer, the extracted data are associated with the application; to detect, based on a signature associated with the extracted data, the occurrence of an event; and upon detection of the occurrence of the event, to generate the gameplay recording from an output of the application.

15 Claims, 6 Drawing Sheets

400

500

600

AUTOMATIC TRIGGERING OF A GAMEPLAY RECORDING USING VISUAL AND ACOUSTIC FINGERPRINTS

BACKGROUND

Screen recording technology provides users with tools to record the video displayed on their screens or the video captured by their cameras. Recorders, such as AMD ReLive, provide players of video games with features (e.g., an instant replay feature) that they can use to generate gameplay clips. In this process, a gameplay output generated by a game engine is continuously saved into a circular buffer (e.g., the graphics processing unit (GPU) buffer). Then, when the player presses a hotkey, the buffer is saved into a gameplay clip. Hence, during the playing of a game, each time the player wishes to generate a gameplay clip, the player has to press a hotkey. Such manual triggering of a gameplay recording may interfere with the player's performance in the game.

Automatic triggering of a gameplay recording is traditionally accomplished by game developers either by integrating the recording functionality into the game engine or by providing an application programing interface (API) through which a game engine can communicate the occurrence of game events to a recorder. The former creates a dependency between the game engine's software development and the recorder's software development, and the latter exposes game events that are developed by game developers to a third-party recorder technology developer. A game recorder that can automatically and independently generate gameplay clips, supporting a wide variety of games, is therefore needed. Such a recorder will save game developers the need to modify their games' code to include recording functionality, or, otherwise, to expose game events via API to third parties.

BRIEF DESCRIPTION OF THE DRAWINGS

A more detailed understanding can be achieved through the following description given by way of example in conjunction with the accompanying drawings wherein.

DETAILED DESCRIPTION

Figure 1:
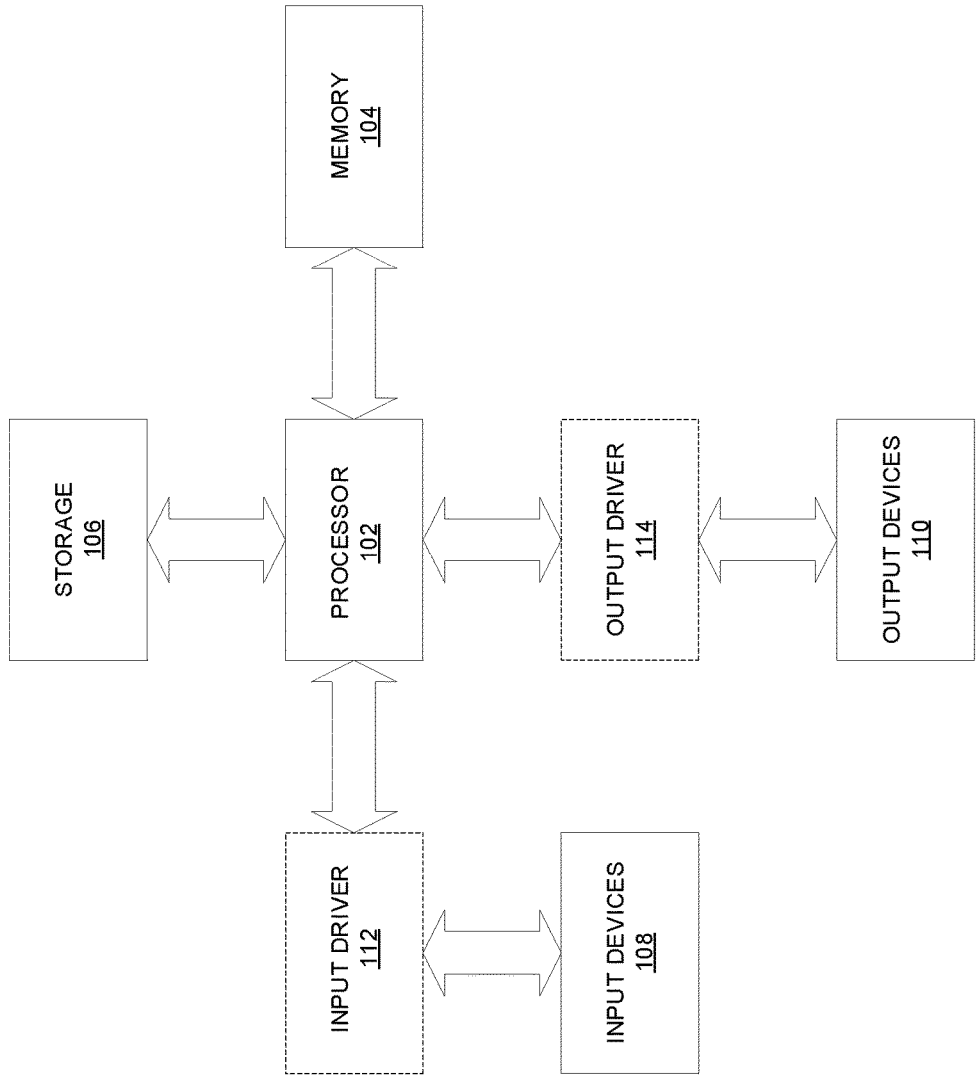
FIG. 1 is a block diagram of an example device in which one or more features of the disclosure can be implemented.

The present disclosure describes systems and methods for automatic triggering of the recording of gameplay clips. Through these systems and methods, a player (or a user) of a game can play a game without being interrupted by the need to press a hotkey each time the player desires to record a gameplay clip, typically following the occurrence of a game event. Moreover, systems and methods described herein free game developers of the need to integrate recording software into their game engine software, or, otherwise, the need to export API that communicates game events to third-party developers of a recording system.

Visual and acoustic effects are rendered into a game's graphics and sound (i.e., a game's gameplay) to provide players with feedback on their actions as they play the game. The occurrence of a visual or an acoustic effect in the gameplay constitutes a "game event" or an "event." Techniques disclosed herein utilize the detection of game events to automatically trigger the recording of a gameplay when those events occur. To automatically detect the occurrence of a game event, fingerprints (referred to herein as "signatures") that uniquely characterize visual or acoustic effects are used. Once an event associated with a visual or an acoustic effect is detected, the generation of a gameplay clip can be triggered.

Furthermore, techniques disclosed herein detect events associated with visual, acoustic, and sensory cues. A visual cue can be extracted from video data captured by one or more cameras. Visual cues can be distinct image patterns—for example, a gesture made by a player can serve as a visual cue. An acoustic cue can be extracted from audio data captured by one or more microphones. Acoustic cues can be distinct audio patterns—for example, a command uttered by a player can serve as an acoustic cue. A sensory cue can be extracted from sensory measurements. Sensory cues can be pre-determined movements or poses—for example, a player's pose as measured by transceivers attached to the player's body can serve as a sensory cue. Hence, signatures that uniquely characterize these cues can also be used by techniques described herein to automatically trigger the generation of a gameplay clip.

The present disclosure describes a method for automatically generating a gameplay recording (e.g., a gameplay clip) from an application. In an alternative, the method comprises operations that: extract data from a buffer, the extracted data are associated with the application; detect, based on a signature associated with the extracted data, the occurrence of an event; and upon detection of the occurrence of the event, generate the gameplay recording from an output of the application.

The present disclosure also describes a recording system for automatically generating a gameplay recording from an application. In an alternative, the system comprises a memory and a processor. The processor is configured to: extract data from a buffer in the memory, wherein the extracted data are associated with the application, detect, based on a signature associated with the extracted data, the occurrence of an event; and upon the detection of the occurrence of the event, generate a gameplay recording from an output of the application.

Furthermore, the present disclosure describes a non-transitory computer-readable medium comprising instructions executable by at least one processor to perform operations for automatically generating a gameplay recording from an application. In an alternative, the operations comprise: extracting data from a buffer, the extracted data are associated with the application; detecting, based on a signature associated with the extracted data, the occurrence of an event; and upon detection of the occurrence of the event, generating the gameplay recording from an output of the application.

In one example, the detection of the occurrence of an event can be carried out by computing a signature from the extracted data, comparing the signature to signatures stored in a database, and then determining that an event occurred, if a match is found between the computed signature and at least one signature from the database.

In another example, the detection of the occurrence of an event can be carried out by computing a signature from the extracted data, and, then, determining that an event occurred based on a machine learning model. The machine learning model can be trained based on exemplary pairs of signatures and corresponding events of interest.

The extracted data, based on which a detection is performed, can be extracted from a buffer that contains data comprising the gameplay output. In such a case, for example, the signature used for detection can be characteristic of a visual effect or an acoustic effect rendered in the extracted data. Alternatively, or in addition, the extracted data, based on which a detection is performed, can be extracted from a buffer that contains data captured from a scene of the game—e.g., the data captured can comprise video data, audio data, or sensory data. In such a case, for example, the signature used for detection can be characteristic of a visual, an acoustic, or a sensory cue present in the extracted data.

FIG. 1 is a block diagram of an example device 100 in which one or more features of the disclosure can be implemented. The device 100 can include, for example, a computer, a gaming device, a handheld device, a set-top box, a television, a mobile phone, a server, a tablet computer, or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102 or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
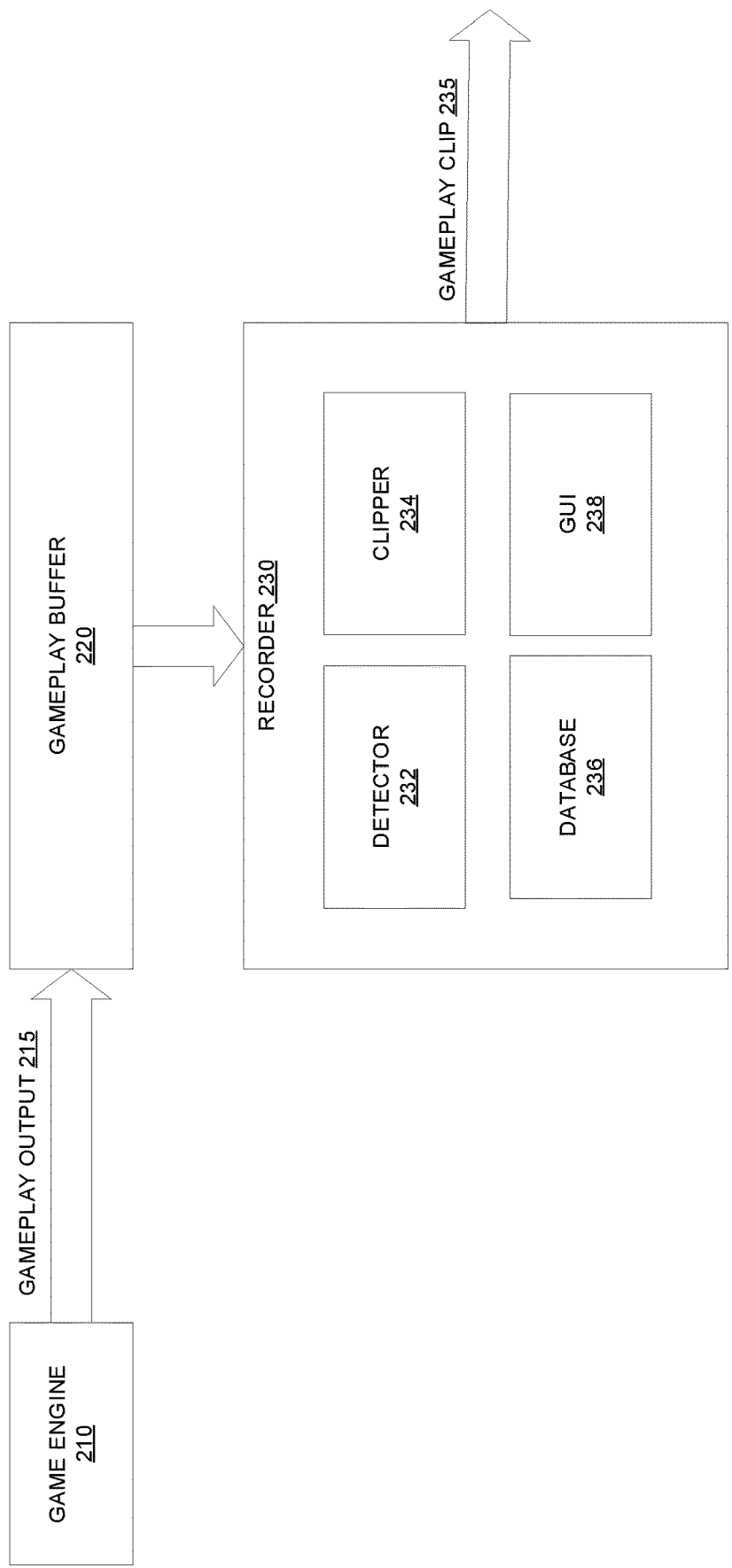
FIG. 2 is a block diagram of one example of a recording system, employable by the device of FIG. 1, in which one or more features of the disclosure can be implemented.

FIG. 2 is a block diagram of one example of a recording system 200, employable by the device of FIG. 1, in which one or more features of the disclosure can be implemented. The recording system 200 can include a game engine 210, a gameplay buffer 220, and a recorder 230. The recorder 230 can access the gameplay buffer 220; the gameplay buffer stores a gameplay output 215 that is continuously generated by the game engine 210 during the playing of a game by a user. The recorder 230 includes, for example, a detector 232, a clipper 234, a database 236, and a graphical user interface (GUI) 238. The recorder 230 can automatically generate and output gameplay clips 235 based on events it detects 232 during the playing of a game, as is explained in detail below. The gameplay clips 235 can be replayed to the user and/or can be shared with the user's community on social media, e.g., the generated gameplay clips can be uploaded into the feeds of the user's contacts on social media.

Typically, during the playing of a game by a user, the game engine 210 generates a live stream with content that is a function of the game's logic and the player's interactions with it. Such a live stream, i.e., the gameplay output 215, can include a video track containing 3D animated graphics and a corresponding audio track associated with the played game. During the playing of a game, the gameplay output 215 is buffered in the gameplay buffer 220 in a circular manner—the first frame (or data segment) to be buffered in is also the first frame (or data segment) to be removed from the buffer. The buffering of live stream, such as the gameplay output 215, allows for the realtime processing of the data in the buffer by system components that can access the buffer, such as the recorder 230.

The detector 232 can detect the occurrence of an event associated with the game based on, for example, the processing of the data currently stored in the gameplay buffer 220. Thus, the detector 232 can be set to extract the most recent data in the buffer, possibly video and audio data within a time window that precedes or overlaps the current time. The detector 232 can then process the extracted data to detect the occurrence of a game event. Once an event has been detected, the clipper 234 can be triggered to output a gameplay clip 235, generated from content currently stored in the gameplay buffer 220.

The detector can carry out the detection of events, associated with visual or acoustic effects, using information in the database 236. The database 236 can contain signatures that uniquely characterize visual or acoustic effects that may be rendered in the gameplay output 215 by the game engine 210. The database 236 can also contain operating parameters used by the recorder 230, for example, parameters and/or training data of a machine learning model used for the detection of the visual or the acoustic effects. The recorder 230 can also include a GUI 238 through which the user playing the game can set up recording parameters. For example, the user can select visual or acoustic effects out of which signatures will be created and then used by the recorder 230 to trigger the clipping of gameplays. The user can also define custom signatures. In another example, the user, via the GUI 238, can select what social communities to share clipped gameplays with.

Figure 3:
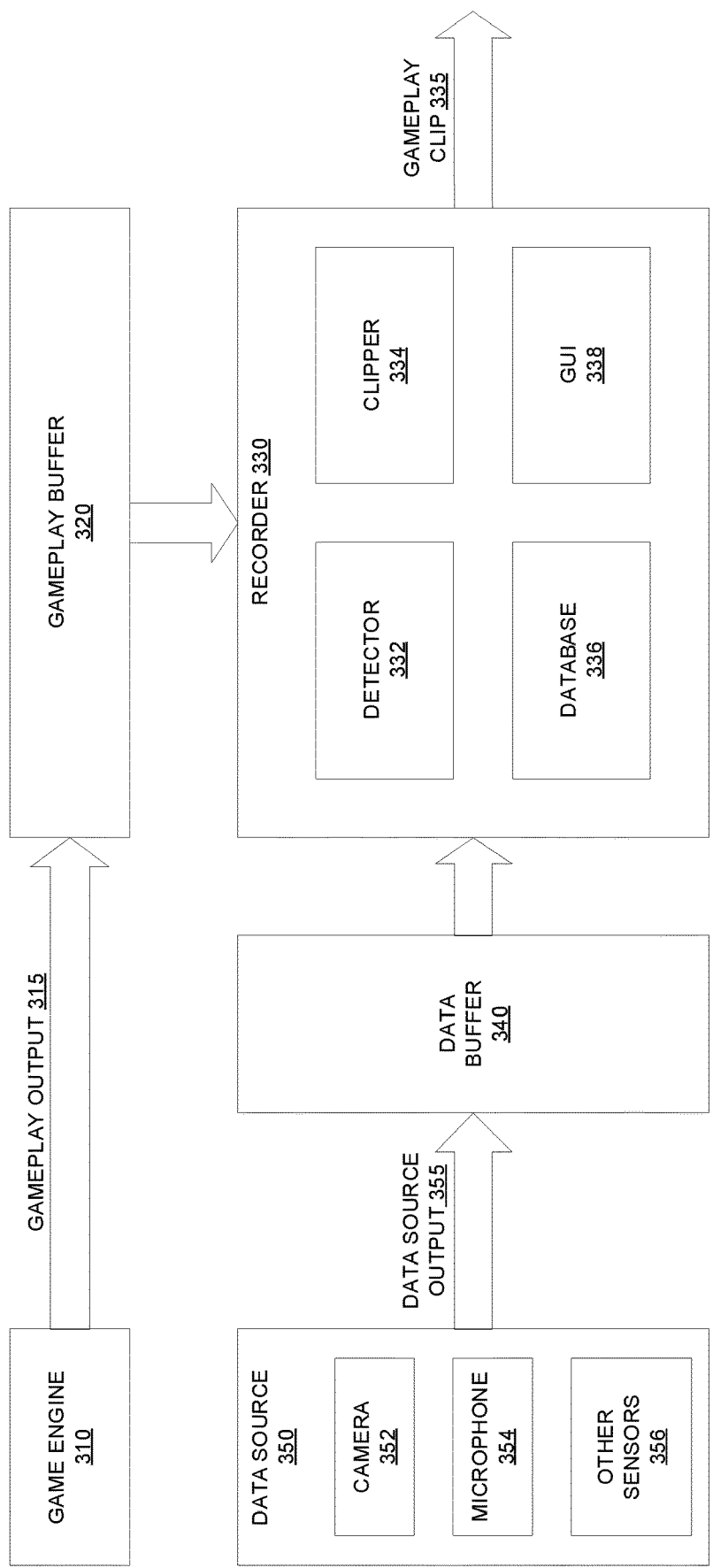
FIG. 3 is a block diagram of another example of a recording system, employable by the device of FIG. 1, in which one or more features of the disclosure can be implemented.

FIG. 3 is a block diagram of another example of a recording system 300, employable by the device of FIG. 1, in which one or more features of the disclosure can be implemented. The recording system 300 can include a game engine 310, a gameplay buffer 320, a recorder 330, a data buffer 340, and a data source 350. The recorder 330 can access the gameplay buffer 320 and the data buffer 340. The gameplay buffer 320 stores a gameplay output 315 that is generated by the game engine 310, and the data buffer 340 stores data that are received from the data source 350. For example, the data source 350 feeds the data buffer 340 with data streams, including a video stream captured by one or more cameras 352, an audio stream captured by one or more microphones 354, or sensory data captured by any other sensors 356. The recorder 330 can include, for example, a detector 332, a clipper 334, a database 336, and a GUI 338. The recorder 330 can automatically generate and output gameplay clips 335 based on events it detects during the playing of a game, as is explained in detail below. The gameplay clips 335 can be replayed to the user and/or can be shared with the user's community on social media, e.g., the generated gameplay clips can be uploaded into the feeds of the user's contacts on social media.

As mentioned above, during the playing of a game by a user, the game engine 310 generates a live stream (i.e., the gameplay output 315) with a content that is a function of the game's logic and the player's interactions with it. In addition, during the playing of the game by the user, the data source 350 can stream video captured by the one or more cameras 352. The video captured can cover the scene of the game, including the player and other participants. Thus, the video captured can contain visual patterns such as gestures made by the player or the other participants. Certain visual patterns can be used as visual cues that when detected 332 can trigger the clipping 334 of content from the gameplay buffer 320. The data source 350 can stream audio captured by the one or more microphones 354. The captured audio can contain audio emitted from the device executing the game, speech uttered by the player or the other participants, or any other surrounding sound. Hence, acoustic effects present in the emitted audio, specific commands present in the uttered speech, or specific sound patterns present in the surrounding sound can be used as acoustic cues that when detected 332 can trigger the clipping 334 of content from the gameplay buffer 320. The data source 350 can also stream sensory data captured by the other sensors 356. The captured sensory data can contain, for example, range measurements received from transceivers attached to the player, the other participants, or other objects at the scene of the game. Patterns of range measurements can be used as sensory cues that when detected 332 can also trigger the clipping 334 of content from the gameplay buffer 320.

Similar to the manner in which the gameplay output 315 can be buffered in the gameplay buffer 320, the data source output 355 can be buffered in the data buffer 340 in a circular manner—the first frame (or data segment) to be buffered in is also the first frame (or data segment) to be removed from the buffer. The buffering of live streams, such as those provided in the data source output 355, allows for the realtime processing of the buffered streams by system components that can access the buffer 340, such as the recorder 330.

The detector 332 can detect the occurrence of an event associated with the game based on the processing of the data currently stored in the gameplay buffer, as explained with respect to the recorder 230 of FIG. 2. Alternatively, or in addition, the detector 332 can detect the occurrence of an event associated with the game based on the processing of the data currently stored in the data buffer 340. To facilitate detection of events, the detector 332 can be set to extract the most recent data in the data buffer 340, possibly video, audio, or other sensory data within a time window that precedes or overlaps the current time. The detector 332 can then process the extracted data to detect the occurrence of an event. Once an event has been detected, the clipper 334 can be triggered to output a gameplay clip 335, generated from content currently stored in the gameplay buffer 320. In an alternative, the clipper 334 can integrate content extracted from the data buffer 340 into content extracted from the gameplay buffer 320. For example, the clipper 334 can insert a video of the player (as captured by one or more cameras 352) into the content extracted from the gameplay buffer 320.

The detector 332 can carry out the detection of events, associated with visual, acoustic, or sensory cues, using information in the database 336. The database 336 can contain signatures that characterize visual, acoustic, or sensory cues that may be present in the data source output 335. The database 336 can also contains, operating parameters used by the recorder 330, for example, parameters and/or training data of a machine learning model used for the detection of events associated with the visual, acoustic, or sensory cues. The recorder 330 can also include a GUI 338 through which the user playing the game can set up recording parameters. For example, the user can select visual, acoustic, or sensory cues, of which signatures will be used by the recorder 330 to trigger the clipping of gameplays. The user can also define custom signatures. In another example, the user, via the GUI 338, can select what social communities the user wishes to share clipped gameplays with.

Figure 4:
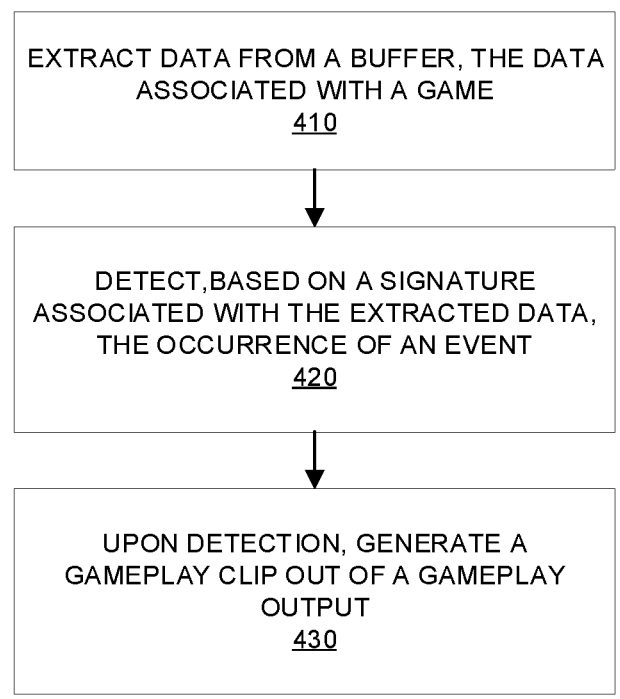
FIG. 4 is a flow chart of an example recording method, with which one or more features of the disclosure can be processed.

FIG. 4 is a flow chart of an example recording method 400, with which one or more features of the disclosure can be processed. The recording method 400 can be employed by the recorder 230 of FIG. 2 or by the recorder 330 of FIG. 3. The method starts, in step 410, with the extraction of data from a buffer that contains data associated with a game currently being played by a user. The data may be extracted from the gameplay buffer 220, 320, in which case it will contain gameplay output 215, 315 generated by the game engine 210, 310. Alternatively, or in addition, the data may be extracted from the data buffer 340, in which case it will contain data source output 355 captured by the data source 350, e.g., data captured by the one or more cameras 352, the one or more microphones 354, or the other sensors 356. For example, the data extracted 410 can be a data sequence that is extracted from the buffer 220, 320, 340 within a time window that precedes or overlaps the current time.

Once data associated with the game are extracted from the buffer, in step 420, the occurrence of an event can be detected based on a signature associated with the extracted data. In an alternative, the user, when setting the recorder 230, 330 can determine, possibly from a list presented to the player via the GUI 238, 338, what constitutes an event to be detected. For example, when data are extracted 410 from the gameplay buffer 220, 320, the user can select visual effects and/or acoustic effects, so that an event occurs when these selected effects are detected to be rendered in the extracted data. In another example, when data are extracted 410 from the data buffer 340, the user can select visual, acoustic, or sensory cues, so that an event occurs when these selected cues are detected to be present in the extracted data.

Thus, in step 420, the detection of the occurrence of an event is based on a signature associated with the extracted data. A signature can be any metric that uniquely identifies a certain visual or acoustic effect or a certain visual, acoustic, or sensory cue associated with the game. A signature that uniquely identifies an effect or a cue associated with the game is indicative of the occurrence of an event and, therefore, facilitates a detection of that event. For example, a signature of an acoustic effect or an acoustic cue can be computed based on a spectrogram, while a signature of a visual effect or a visual cue can be computed based on histogram-based image descriptors. Upon the detection of an event, in step 430, a clip can be generated out of the gameplay content that is currently stored in the gameplay buffer 220, 320.

Figure 5:
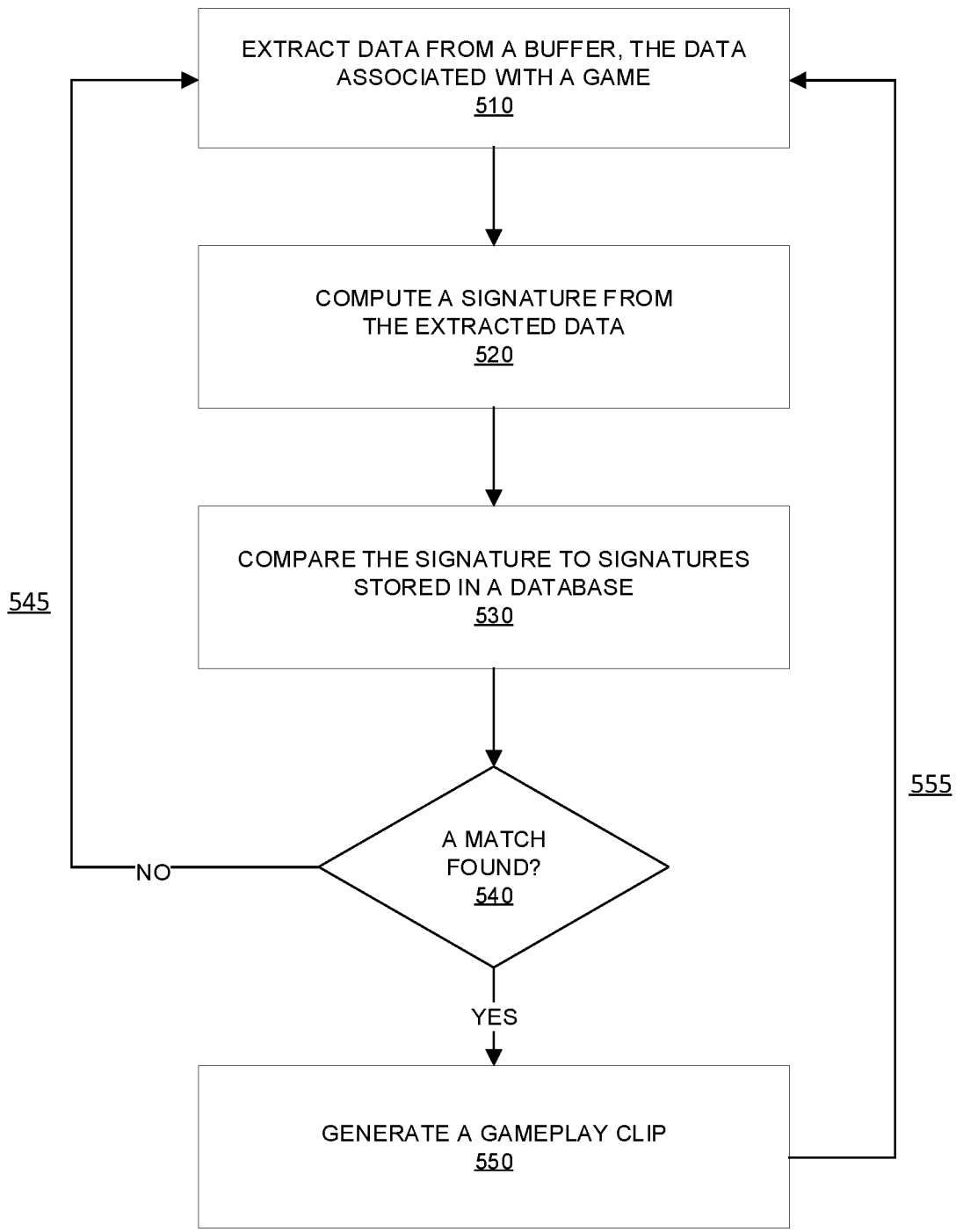
FIG. 5 is a flow chart of one detection method, with which one or more features of the disclosure can be processed.

FIG. 5 is a flow chart of one detection method 500, with which one or more features of the disclosure can be processed. The method 500 can make use of signatures—characterizing visual or acoustic effects and/or visual, acoustic, or sensory cues—that were computed and were stored in the database 236, 336 before the playing of the game began. Thus, each signature in the database uniquely corresponds to a certain effect or cue. The effects and cues, for which signatures are computed in the database, can be determined by the developer of the recording system 200, 300, or, otherwise, the user can be provided, via the GUI 238, 338, with tools to select effects or cues for which signatures will be computed and stored in the database.

To detect the occurrence of an event, the method 500 starts, in step 510, with extracting data that are associated with the game from a buffer 220, 320, 340. In step 520, a signature is computed from the extracted data. The computed signature is then compared with signatures stored in the database 236, 336, in step 530. If a match is found to at least one signature of the signatures stored in the database 540, such a match constitutes the detection of an event that can trigger the generation of a gameplay clip, in step 550. Whether an event is detected 555 (and a clip has been generated) or not 545, the method 500 can be repeated in a loop, continuing the detection of upcoming events during the playing of the game. The frequency in which data are extracted from the buffer 510 and a signature computed 520 therefrom, can be an operating parameter of the recorder 230, 330 settable by the user. In an alternative, the frequency in which data are extracted can be dependent on the detection of an event. For example, when an event has been detected, and as a result the current content of the gameplay buffer has been clipped into a gameplay clip, the next data extraction can be delayed so that it is performed for data not included in the currently generated clip.

Figure 6:
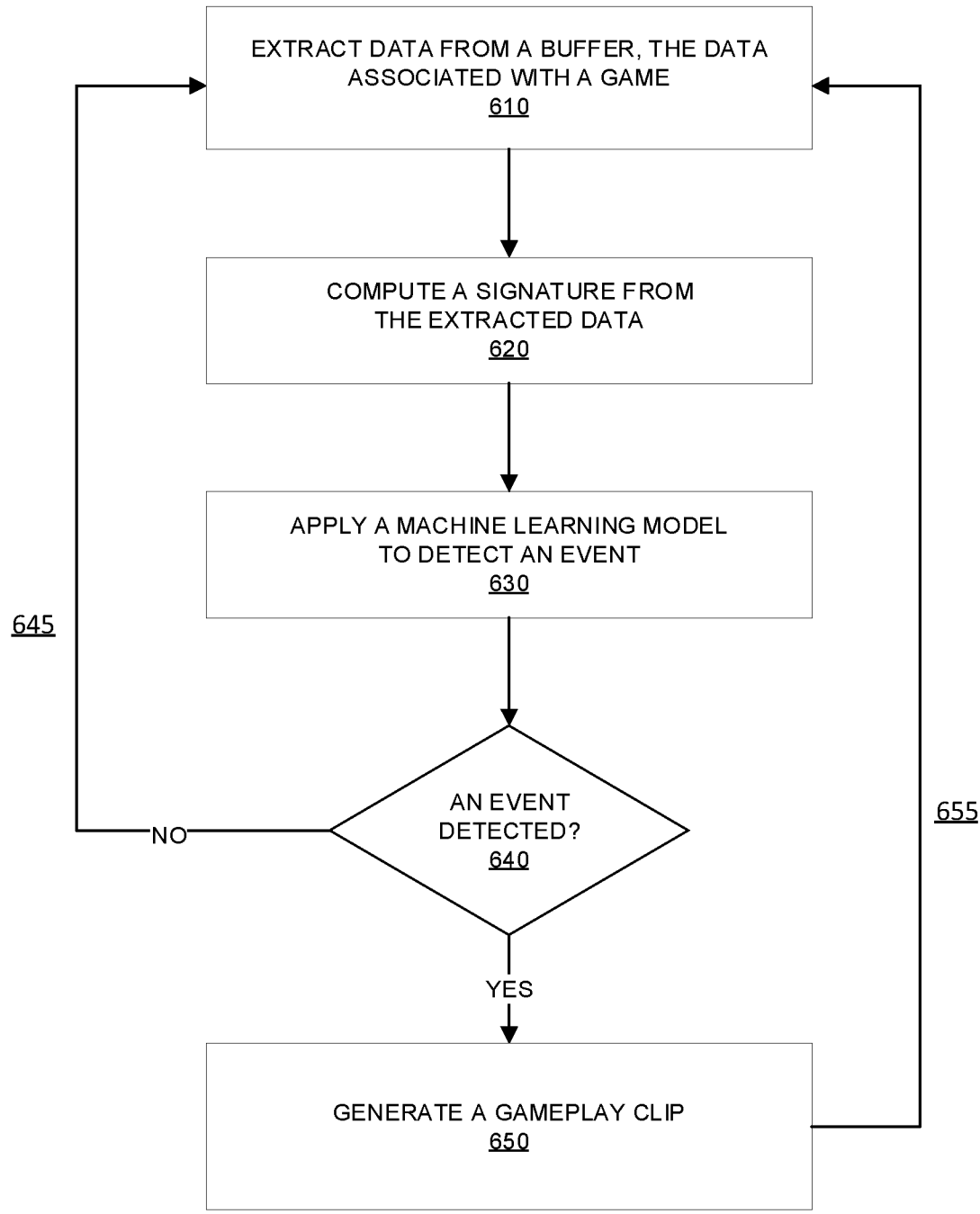
FIG. 6 is a flow chart of another detection method, with which one or more features of the disclosure can be processed.

FIG. 6 is a flow chart of another detection method, with which one or more features of the disclosure can be processed. The method 600 applies a machine learning model to detect whether a signature, computed from data extracted in accordance with step 610, correlates with an event. The model may be based on one or more neural networks (NN) such as convolutional neural networks (CNN), recurrent neural networks (RNN), artificial neural networks (ANN), and a combination thereof. The model can be trained to find the correlation between signatures and respective visual or acoustic effects and/or the correlation between signatures and respective visual, acoustic, and sensory cues associated with the game. That way, a signature at the input of the model generates an output that is indicative of the occurrence of an event that is associated with the respective effect or cue. The training of the machine learning model results in model parameters that can be stored in the database 236, 336, to be used during the application of the model. The training of the model can be done by the developer of the recorder 230, 330. In an alternative, the model can be trained or updated by the user as new effects and cues and their corresponding signatures are added, possibly by the user, to the database 236, 336.

To detect the occurrence of an event, the method 600 starts, in step 610, by extracting data that are associated with the game from a buffer 220, 320, 340. In step 620, a signature is computed from the extracted data. Then, in step 630, the signature is fed into the machine learning model. Based on that signature, the model can provide an output that is indicative of either a detection or no detection of the occurrence of an event, in step 640. If an event has been detected, in step 650, a clip is generated from the content of the gameplay buffer 220, 320. Whether an event has been detected 655 (and a clip has been generated) or not 645, the method 600 can be repeated in a loop, continuing the detection of upcoming events during the playing of the game. As explained above, the frequency in which data are extracted from the buffer 610 and a signature is computed therefrom, can be an operating parameter of the recorder 230, 330 settable by the user. In an alternative, the frequency in which data are extracted can be dependent on the detection of an event. For example, when an event has been detected, and as a result the current content of the gameplay buffer has been clipped into a gameplay clip, the next data extraction can be delayed so that it is performed for data not included in the generated clip.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein, including, but not limited to, the processor 102, the input driver 112, the input devices 108, the output driver 114, the output devices 110, the game engine 210, 310, the recorder 230, 330 (including the detector 232, 332, the clipper 234, 334, or the GUI 238, 338) can be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be mask works that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for use by a recording system for automatically generating a recording from an application, comprising:
   detecting, based on a signature associated with data extracted in real-time from a buffer that stores an output of the application, an occurrence of a game event within the application using a machine learning model, wherein the signature is characteristic of an acoustic effect generated by the application and is computed based on audio data generated by the application and the signature uniquely characterizes the occurrence of the game event within the application; and
   upon detection of the occurrence of the game event, automatically generating the recording from the output of the application using the recording system, wherein the recording system is not integrated into the application.

2. The method of claim 1, wherein the detecting of the occurrence of the game event comprises:
   computing the signature from the extracted data;
   comparing the signature to signatures stored in a database; and
   determining that the game event occurred, if a match is found between the signature and at least one matching signature of the signatures in the database.

3. The method of claim 1, wherein
   the machine learning model is trained based on exemplary pairs of signatures and corresponding events of interest.

4. The method of claim 1, wherein the buffer contains data captured from a scene of a game, the data captured comprise at least one of video data, audio data, or sensory data.

5. The method of claim 1, wherein the buffer is a circular buffer.

6. A recording system for automatically generating a recording from an application, comprising:
   a memory; and
   a processor, wherein the processor is configured to:
      detect, based on a signature associated with data extracted in real-time from a buffer in the memory that stores an output of the application, an occurrence of a game event within the application using a machine learning model, wherein the signature is characteristic of an acoustic effect generated by the application and is computed based on audio data generated by the application and the signature uniquely characterizes the occurrence of the game event within the application; and
      upon the detection of the occurrence of the game event, automatically generate the recording from the output of the application using the recording system, wherein the recording system is not integrated into the application.

7. The recording system of claim 6, wherein the processor is further configured to:
   compute the signature from the extracted data;
   compare the signature to signatures stored in a database; and
   determine that the game event occurred, if a match is found between the signature and at least one matching signature of the signatures in the database.

8. The recording system of claim 6, wherein
   the machine learning model is trained based on exemplary pairs of signatures and corresponding events of interest.

9. The recording system of claim 6, wherein the buffer contains data captured from a scene of a game, the data captured comprise at least one of video data, audio data, or sensory data.

10. The recording system of claim 6, wherein the buffer is a circular buffer.

11. A non-transitory computer-readable medium comprising instructions executable by at least one processor of a recording system to perform operations for automatically generating a recording from an application, the operations comprising:
    detecting, based on a signature associated with data extracted in real-time from a buffer that stores an output of the application, an occurrence of a game event within the application using a machine learning model, wherein the signature is characteristic of an acoustic effect generated by the application and is computed based on audio data generated by the application and the signature uniquely characterizes the occurrence of the game event within the application; and
    upon detection of the occurrence of the game event, automatically generating the recording from the output of the application using the recording system, wherein the recording system is not integrated into the application.

12. The non-transitory computer-readable medium of claim 11, wherein the detecting of the occurrence of the game event comprises:
    computing the signature from the extracted data;
    comparing the signature to signatures stored in a database; and
    determining that the game event occurred, if a match is found between the signature and at least one matching signature of the signatures in the database.

13. The non-transitory computer-readable medium of claim 11, wherein
    the machine learning model is trained based on exemplary pairs of signatures and corresponding events of interest.

14. The non-transitory computer-readable medium of claim 11, wherein the buffer contains data captured from a scene of a game, the data captured comprise at least one of video data, audio data, or sensory data.

15. The non-transitory computer-readable medium of claim 11, wherein the buffer is a circular buffer.

* * * * *